United States Patent Office 2,736,013
Patented Feb. 21, 1956

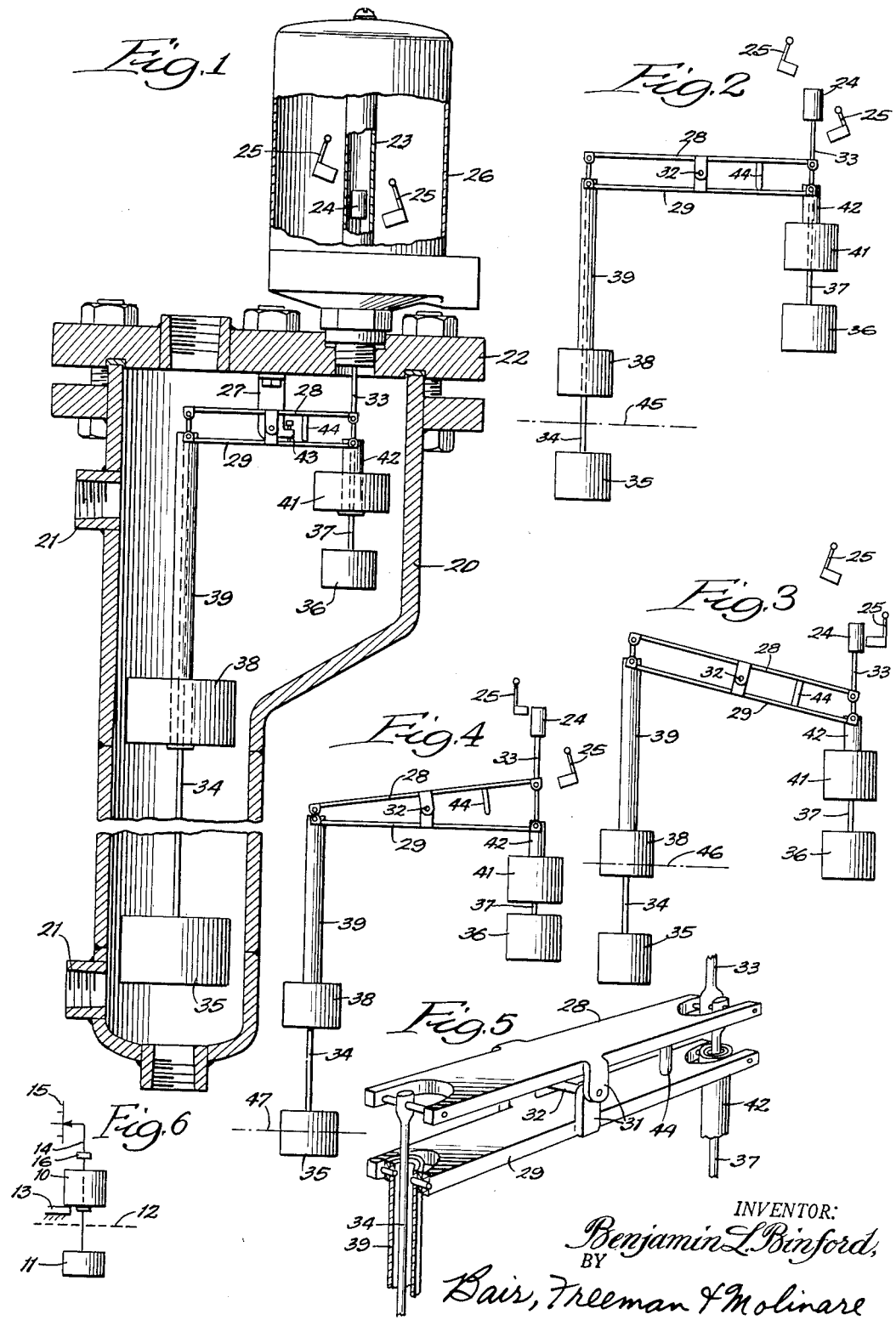

2,736,013

LIQUID LEVEL RESPONSIVE MECHANISM

Benjamin L. Binford, Chicago, Ill., assignor to Magnetrol, Inc., Chicago, Ill., a corporation of Illinois Application December 13, 1952, Serial No. 325,870

8 Claims. (Cl. 340—244)

This invention relates to liquid level responsive mechanism, and more particularly to a mechanism to indicate or to effect a control operation in response to variations of a predetermined amount in a liquid level.

It is desirable in many types of apparatus such, for example, as steam boilers to sense variations in liquid level in excess of a predetermined amount either way from normal, and to indicate such variations or to effect a control operation in response thereto.

In many types of apparatus it is desirable to provide a relatively wide neutral range corresponding to normal level variations and to effect an indicating or control operation only when the level varies beyond the neutral range. It is also highly desirable to provide a high degree of stability in the operation of the apparatus.

It is one of the objects of the present invention to provide a liquid level responsive mechanism which satisfies these several requirements and which will respond to predetermined variations of liquid level with a high degree of stability and accuracy.

Another object is to provide a liquid level responsive mechanism in which a pair of displacers responsive to high and low levels respectively, are connected through a lost motion connection with each other to operate the indicating or control elements.

Still another object is to provide a liquid level responsive mechanism in which a high level displacer normally rests on a stop and engages a low level displacer to prevent upward movement thereof except when the high level displacer is partially submerged. Preferably the high and low level displacers are connected through a lost motion connection so that the low level displacer can move downward when it is partially exposed.

A further object is to provide a liquid level responsive mechanism in which liquid displacers are supported by pivotally mounted, counterbalanced levers which are formed with interengaging parts to provide a lost motion connection therebetween.

A still further object is to provide a liquid level responsive mechanism in which all of the parts are enclosed in a casing which can also serve as a liquid column for sight glass on boilers and the like.

The above and other objects and features of the invention will be more readily apparent from the following description when read in connection with the accompanying drawing in which Figure 1 is a vertical sectional view through a liquid level responsive apparatus embodying the invention;

Figures 2, 3 and 4 are partial diagrammatic views indicating different positions of the apparatus under different conditions;

Figure 5 is a perspective view with parts in section of the supporting levers, and Figure 6 is a diagrammatic view illustrating the principles of the invention.

Referring first to Figure 6, there is illustrated diagrammatically a mechanism for indicating departures of a predetermined amount in the level of a liquid. The mechanism as shown, includes a high level displacer 10 which is of less specific gravity than the liquid to be measured and a similar low level displacer 11. The displacers are so related to each other that the unsubmerged weight of the displacer 10 is greater than the buoyant effect of the displacer 11. The displacer 10 normally lies above the liquid level as indicated by dotted line 12, and the displacer 11 normally lies below the liquid level.

The displacer 10 is supported by a fixed stop 13 which limits its downward movement to a point above the normal liquid level. The displacer 11 is connected to a rod 14 which extends slidably through the displacer 10 and which may carry an indicating pointer movable over a scale 15 indicative of liquid level conditions. The rod 14 carries a pair of spaced stops 16 and 17 which are adapted to engage the displacer 10 upon relative movement between the rod and displacer.

When the liquid is at its normal level completely submerging the displacer 11 and below the displacer 10, the parts will occupy their normal position shown. At this time the displacer 10 seats against the stop 13 and the stop 17 engages the bottom of the displacer 10 thereby to limit upward travel of the displacer 11. At this time the parts are in their normal position and the indicator on the rod 14 is in its central position indicating normal level.

If the level should fall to expose the displacer 11 it would tend to drop with the level causing the rod 14 to move downward thereby moving the indicator to indicate low level. This movement can be effected due to free lost motion of the rod 14 relative to the displacer 10 and without requiring any movement of the displacer 10. If the level should rise to partially submerge the displacer 10, it and the displacer 11 will move upward together with rising liquid level to indicate a high level. It will thus be seen that through an extremely stable and simple mechanism variations in excess of a predetermined amount are accurately sensed and indicated.

Figures 1 through 5 show a practical mechanism embodying the invention including an open topped casing 20 having taps 21 vertically spaced thereon by which it can be connected to spaced points on a steam boiler drum or the like above and below the liquid level therein to contain a column of water at the same level as the water in the boiler.

The top of the casing is adapted to be closed by flat cover plate 22 which may be securely bolted to the casing to form an airtight closure therefor. The cover plate carries a non-magnetic tube 23 formed of brass or the like, which extends upward from the cover plate and in which a magnetic armature 24 is mounted for vertical sliding movement.

A pair of levers 25 pivoted at vertically spaced points may be mounted adjacent the tube and may carry at their free ends magnets which will be attracted by the armature when it moves to the levels of the respective magnets. The levers 25 may operate switches to effect indicating or control operations and the entire magnet mechanism may be enclosed in a cover 26. This construction may follow that more particularly described and claimed in my Patent No. 2,503,089 or in my co-pending application Ser. No. 856, filed January 7, 1948, now Patent No. 2,625,042 and since it forms, per se, no part of the present invention will not be described in further detail.

The cover plate 22 carries on its lower surface a U-shaped bracket 27 which forms a pivot mounting for a pair of levers 28 and 29. As best seen in Figure 5, the levers 28 and 29 are formed with side ears 31 which are pivotally connected to the bracket 27 through a transverse pivot pin 32 so that the levers normally lie in vertically spaced parallel relation for pivotal movement about a horizontal axis intermediate their ends.

The upper lever 28 is connected at one end through a link 33 with the armature 24 to shift the armature vertically as the lever 28 turns. At its opposite end the lever 28 is connected through a rod 34 to a lower displacer 35 which normally lies below the liquid level in the casing 20. The displacer 35 may be conveniently made of a material whose density is greater than that of the liquid to be measured and in such case is counterbalanced by a weight 36 suspended from the first named end of the lever 28 by a rod 37. The relative weights of the displacer and weight 36 are such that when the displacer is completely submerged the lever 28 tends to tilt clockwise and when the displacer 35 is approximately half exposed the lever 28 will tilt counterclockwise.

The lever 29 carries at its left end an upper displacer 38 which is connected to the lever by a tube 39 which slidably surrounds the rod 34. In this way, the rod can move relative to the displacer 38 and tube 39 but downward movement thereof will be limited by engagement of the left ends of the levers 28 and 29. The displacer 38 is counterbalanced by a weight 41 which is connected to the right end of the lever 29 by a tube 42 which slidably surrounds the rod 37. Thus complete relative movement between the levers is provided for. The displacer 38 is so related to the weight 41 that when the displacer is fully exposed as when the liquid level is in its normal range, it overbalances the weight 41 and tends to turn the lever 29 counterclockwise. When the displacer is partially submerged the weight 41 will overbalance it and turn the lever 29 clockwise.

Downward movement of the displacer 38 is limited by a fixed stop which may conveniently be formed by a bracket 43 on the yoke 27 carrying an adjustable stop screw to engage the upper surface of the lever 29 to the right of its pivot point. With this construction, counterclockwise movement of the lever 29 is limited so that the displacer 38 will be held in a position above the normal liquid level. To limit clockwise movement of the lever 28 relative to the lever 29 a pin 44 is provided on the lever 28 to engage the upper surface of the lever 29 when the levers are approximately parallel.

When the liquid is at its normal level as indicated in Figures 1 and 2, the displacer 38 will be held by the fixed stop at a point above the liquid level as indicated by the line 45 in Figure 2. The displacer 35 will be fully submerged and will tend to turn the lever 28 clockwise but this will be prevented by engagement of the pin 44 with the lever 29 so that the parts will occupy the central or neutral position shown. In this position the armature 24 lies between the magnets carried by the levers 25 so that neither magnet will be attracted and the levers will both be swung outward from the tube 23 as indicated.

Upon a rise in level to the line 46 as indicated in Figure 3, the upper displacer 38 will be partially submerged so that both levers 28 and 29 tend to turn clockwise to the position shown. At this time the armature 24 will be moved downward to attract the lower magnet 25 thereby to swing the lower lever and open or close a control switch to produce an indicating or control operation.

Upon a drop in the level to the line 47 as shown in Figure 4, the lower displacer 35 will be partially exposed until it becomes heavier than the counterweight 36. At this time the upper lever 28 will move counterclockwise without affecting the lower lever 29. Since the armature 24 is connected to the upper lever it will be moved upward into register with the upper magnet to swing the upper lever 25 inward and operate a control switch which effects the desired indicating or control operation in response to high level. It will be seen that in all positions of the parts a high degree of stability is obtained and that positive control movements will be produced when the level departs from the normal value a predetermined amount in either direction.

While one embodiment of the invention has been shown and described in detail, it will be understood that this is illustrative only and is not to be taken as a definition of the scope of the invention, reference being had for this purpose to the appended claims.

What is claimed is:

1. A liquid level responsive mechanism comprising a pair of vertically spaced displacers, one lying above and the other below the normal level of liquid to be measured, supporting means for the displacers, the displacers and supporting means being so constructed and arranged that when the liquid is at its normal level said one of the displacers exerts a downward force and said other of the displacers exerts an upward force not greater than the downward force, a stop to limit downward movement of said one of the displacers without affecting freedom of said other of the displacers to move downward, interengaging parts in the supporting means defining a lost motion connection between the displacers, and indicating means connected to said other of the displacers to be operated thereby, said other of the displacers having sufficient buoyancy when submerged and sufficient weight when unsubmerged to operate the indicating means, said one of the displacers rising with the liquid to remove its downward force and allow said other of the displacers to rise and operate the indicating means in one direction and said one of the displacers remaining in engagement with the stop as the liquid falls to the level of the other of the displacers which falls with the liquid due to the lost motion connection to operate the indicating means in the opposite direction.

2. A liquid level responsive mechanism comprising a pair of vertically spaced displacers, one lying above and the other below the normal level of liquid to be measured, a pivoted lever supporting said other of the displacers, indicating means connected to the lever to be operated thereby, a counterbalance weight connected to the lever urging it in a direction to raise the displacer with a force sufficiently greater than the submerged weight of the displacer to operate the indicating means in one direction and sufficiently less than the unsubmerged weight of the displacer to operate the indicating means in the other direction, a stop to limit downward movement of said one of the displacers, and means forming a lost motion connection between the lever and said one of the displacers, the unsubmerged weight of said one of the displacers when it is connected to the lever through the lost motion connection being sufficient to prevent operation of the indicating means of said one direction.

3. A liquid level responsive mechanism comprising a pair of vertically spaced displacers, one lying above and the other below the normal level of liquid to be measured, a pivoted lever supporting said other of the displacers, a counterbalance weight connected to the lever urging it in a direction to raise the displacer with a force greater than the submerged weight of the displacer but less than the unsubmerged weight of the displacer, indicating means connected to the lever to be operated thereby, a stop to limit downward movement of said one of the displacers, a second lever to which said one of the displacers is connected, a counterbalance weight connected to the second lever urging it in a direction to raise said one displacer with a force less than the unsubmerged weight of the displacer but greater than the submerged weight of the displacer, and interengaging parts on the levers defining a lost motion connection therebetween.

4. A liquid level responsive mechanism comprising a pair of vertically spaced parallel levers pivoted on a horizontal axis, indicating means connected to the upper lever, a first displacer lying above the normal level of liquid to be measured, a vertical tube connecting the first displacer to one end of the lower lever, a second displacer lying below the normal level of liquid to be measured, a rod extending slidably through the tube connecting the second displacer to one end of the upper lever, a stop to limit downward movement of the first displacer, and interengaging parts on the levers to limit upward swinging of the upper lever relative to the lower lever.

5. A liquid level responsive mechanism comprising a pair of vertically spaced parallel levers pivoted on a horizontal axis, indicating means connected to the upper lever, a first displacer lying above the normal level of liquid to be measured, a vertical tube connecting the first displacer to one end of the lower lever, a second displacer lying below the normal level of liquid to be measured, a rod extending slidably through the tube connecting the second displacer to one end of the upper lever, a stop to limit downward movement of the first displacer, a counterweight connected to the lower lever urging it in a direction to raise the first displacer with a force less than the unsubmerged but greater than the submerged weight of the first displacer, a counterweight connected to the upper lever urging it in a direction to raise the second displacer with a force greater than the submerged but less than the unsubmerged weight of the second displacer, and interengaging parts on the levers to limit upward swinging of the upper lever relative to the lower lever.

6. A liquid level responsive mechanism comprising a hollow casing adapted to contain liquid and open at its top, a cover plate to close the top of the casing, a tube of non-magnetic material carried by and extending upward from the cover plate, a magnetic armature slidable in the tube, a magnet movably mounted adjacent to the tube to move toward the tube when the armature is aligned therewith, a first displacer in the casing below the normal level of liquid therein, means connecting the first displacer directly to the armature to move the armature as the first displacer moves, a second displacer in the casing above the normal level of liquid therein, a stop to limit downward movement of the second displacer, and means forming a lost motion connection between the second displacer and the armature, the displacers being so related with respect to weight and volume that the first displacer when submerged exerts an upward force less than the unsubmerged weight of the second displacer but greater than the submerged weight of the second displacer.

7. A liquid level responsive mechanism comprising a hollow casing adapted to contain liquid and open at its top, a cover plate to close the top of the casing, a tube of non-magnetic material carried by and extending upward from the cover plate, a magnetic armature slidable in the tube, a magnet movably mounted adjacent to the tube to move toward the tube when the armature is aligned therewith, a lever pivotally mounted on the cover plate on a horizontal axis, a connection between the lever and the armature, a first displacer in the casing connected to the lever and lying below the normal level of liquid in the casing, a second displacer in the casing lying above the normal level of liquid in the casing, a stop to limit downward movement of the second displacer, and means forming a lost motion connection between the second displacer and the lever, the displacers being so related with respect to weight and volume that the first displacer when submerged exerts an upward force less than the unsubmerged weight of the second displacer but greater than the submerged weight of the second displacer.

8. A liquid level responsive mechanism comprising a hollow casing adapted to contain liquid and open at its top, a cover plate to close the top of the casing, a tube of non-magnetic material carried by and extending upward from the cover plate, a magnetic armature slidable in the tube, a magnet movably mounted adjacent to the tube to move toward the tube when the armature is aligned therewith, a lever pivotally mounted on the cover plate on a horizontal axis, a connection between the lever and the armature, a first displacer in the casing connected to the lever and lying below the normal level of liquid in the casing, a second lever pivotally mounted on the cover plate on a horizontal axis and lying parallel to and below the first lever, a tube connected to the second lever and slidably surrounding the connection between the first lever and the first displacer, a second displacer connected to the tube and lying above the normal level of liquid in the casing, interengaging parts on the levers to limit movement of the first lever relative to the second lever in a direction to raise the first displacer, and a stop to limit downward movement of the second displacer, the displacers being so related with respect to weight and volume that the first displacer when submerged exerts an upward force less than the unsubmerged weight of the second displacer but greater than the submerged weight of the second displacer.

References Cited in the file of this patent

UNITED STATES PATENTS

| | | |
|---|---|---|
| 826,659 | Hauger | July 24, 1906 |
| 995,414 | Nault | June 13, 1911 |
| 1,096,470 | Stern | May 12, 1914 |
| 1,424,403 | Hartman et al. | Aug. 1, 1922 |
| 1,604,492 | Smith | Oct. 26, 1926 |
| 1,854,316 | Teesdale | Apr. 19, 1932 |
| 2,267,187 | Bock | Dec. 23, 1941 |
| 2,536,273 | Gahagan | Jan. 2, 1951 |